US006978248B1

(12) United States Patent
Walker et al.

(10) Patent No.: US 6,978,248 B1
(45) Date of Patent: Dec. 20, 2005

(54) SYSTEM AND METHOD FOR MAILING LIST TESTING SERVICE

(75) Inventors: Jay S. Walker, Ridgefield, CT (US); Magdalena Mik, Greenwich, CT (US); Daniel E. Tedesco, New Canaan, CT (US); Dean Alderucci, Ridgefield, CT (US)

(73) Assignee: Walker Digital, LLC, Stamford, CT (US)

(*) Notice: Subject to any disclaimer, the term of this patent is extended or adjusted under 35 U.S.C. 154(b) by 445 days.

(21) Appl. No.: 09/267,489

(22) Filed: Mar. 11, 1999

(51) Int. Cl.[7] .............................. G06F 17/60
(52) U.S. Cl. .................. 705/10; 705/1; 705/7; 705/8; 705/9
(58) Field of Search ............... 705/10, 7–11; 709/206

(56) References Cited

U.S. PATENT DOCUMENTS

| 4,603,232 A | | 7/1986 | Kurland et al. | |
| 4,752,675 A | | 6/1988 | Zetmeir | |
| 5,634,101 A | | 5/1997 | Blau | |
| 5,682,429 A | | 10/1997 | Cordery et al. | |
| 5,793,972 A | | 8/1998 | Shane | |
| 5,794,210 A | | 8/1998 | Goldhaber | |
| 5,805,810 A | | 9/1998 | Maxwell | |
| 6,167,435 A | * | 12/2000 | Druckenmiller et al. | 709/206 |
| 6,292,785 B1 | * | 9/2001 | McEvoy et al. | 705/14 |

FOREIGN PATENT DOCUMENTS

| JP | 05110593 A | * | 4/1993 | ........... H04L 12/54 |
| WO | WO 97/23838 | | 7/1997 | |
| WO | WO 97/24678 | | 7/1997 | |

OTHER PUBLICATIONS

"How to Generate Online Leads from the Web" Interactive Marketing News v3 n10 ; May 10, 1996. [DIALOG].*
Jane Hodges, "Holding E-Mail Accountable", (http://www.acxiom.com), Copyright Date Jan./Feb. 1997.
Ken Magill, "DMI Rolls Out Acxiom Preferred Mail", (http://www.acxiom), Copyright Date Oct. 13, 1997.
"Acxiom Preferred Mail Generates Dramatic Increase in Direct Marketing Response Rates", (http://web.lexis-nexis.com), Copyright Date Oct. 6, 1997.
"Are Consumers, Businesses Ready for E-Mail Marketing?", (http://www.acxiom.com) Copyright Date Nov. 1997.
"Acxiom/Direct Media, Inc. Offers Complete Solution for Internet Direct Marketers; Company Provides "One-Stop-Shopping" for Internet DM Campaign Management", (http://web.lexis-nexis.com) Copyright Date May 11, 1998.
"Postal Products", (http://www.acxiom.com) Download Date Nov. 30, 1998.
"Merge Purge Services", (http://www.acxiom.com) Download Date Nov. 30, 1998.
"Nationwide Data Services", (http://www.acxiom.com) Download Date Feb. 25, 1999.
"AAA Best Mailing Lists", (http://www.bestmailing.com) Download Date Feb. 25, 1999.
"Pro CD Takes Pride in 1996 Accomplishments; Anticipates Future Growth; Acquisition By Acxiom (R) and Third Party Endorsements Enrich Brand," PR Newswire, Financial News Section, Dec. 30, 1996.

* cited by examiner

Primary Examiner—James A Reagan
(74) Attorney, Agent, or Firm—Magdalena M. Fincham

(57) ABSTRACT

A mailing list test service is disclosed that involves a plurality of mailing lists, each mailing list including information about a plurality of list members. The service includes sending an e-mail message to each of a subset of list members. At least one response is received, and one of the lists is selected for use based on the received responses.

50 Claims, 12 Drawing Sheets

| LIST IDENTIFIER 320 | TARGET INDUSTRY 322 | AGE BRACKET 324 | GEOGRAPHICAL AREA 326 | SALARY BRACKET 328 | PRICE 330 |
|---|---|---|---|---|---|
| A | PC TECHNOLOGY | 18 - 25 | NE U.S. | $15,000 - $30,000 | $2,000.00 |
| B | AUTOMOTIVE - SUV | 30 - 42 | MIDWEST U.S. | $50,000 - $75,000 | $4,000.00 |
| C | NON-PROFIT ORGANIZATION (ENV) | 25 - 35 | S. CALIFORNIA | $35,000 - $45,000 | $3,000.00 |
| D | MAC USERS | 30 - 42 | ALL U.S. | $75,000 - $100,000 | $4,000.00 |
| E | PC SOFTWARE | 18 - 25 | ALL U.S. | $18,000 - $35,000 | $2,500.00 |
| F | AUTOMOTIVE - NEW CAR BUYERS | 25 - 35 | ALL U.S. | $45,000 - $65,000 | $3,000.00 |

FIG. 3

| RECIPIENT IDENTIFIER 420 | RECIPIENT NAME 422 | RECIPIENT POSTAL ADDRESS 424 | RECIPIENT E-MAIL 426 | LIST IDENTIFIER(S) 428 |
|---|---|---|---|---|
| 12345 | JOHN DOE | 10 NEW ST. TOWN, USA | DOE@AOL.COM | A ; E |
| 23456 | SUE GREEN | 15 LONG RD. CITY, USA | SUE.GREEN@ JUNO.COM | B |
| 34567 | BOB LOU | 80 CURVING LN. FARM, USA | BOBBY@ SURFREE.COM | B ; F |
| 45678 | BILL LEE | 20 ROUND CIR. PLAINS, USA | BLEE@ SNET.NET | D |
| 56789 | ANN SMITH | 100 WIDE BLVD. METRO, USA | ANNS@AOL.COM | C |

| TEST IDENTIFIER: 0098 | | 502 |
|---|---|---|
| RECIPIENT IDENTIFIER 504 | MAILING LIST IDENTIFIER 506 | RESPONSE 508 |
| 12345 | A | Y |
| 23456 | D | Y |
| 34567 | B | N |
| 34567 | F | Y |
| 56789 | C | Y |
| 67890 | A | N |
| 67890 | E | N |

| TEST IDENTIFIER: 0099 | | | 551 |
|---|---|---|---|
| RECIPIENT IDENTIFIER 552 | MAILING LIST IDENTIFIER 554 | QUESTION IDENTIFIER 556 | ANSWER IDENTIFIER 558 |
| 12345 | A | Q1 | A1 |
| 12345 | A | Q2 | A3 |
| 23456 | B | Q1 | A1 |
| 23456 | B | Q2 | A3 |
| 34567 | B | Q1 | A1 |
| 34567 | B | Q2 | A3 |
| 45678 | C | Q1 | N/A |
| 45678 | A | Q1 | N/A |
| 45678 | A | Q2 | N/A |

560

| TEST IDENTIFIER 0099 | |
|---|---|
| MAILING LIST IDENTIFIER: A11 | |
| QUESTION IDENTIFIER: Q1 | |
| QUESTION: "WHICH COLOR COMBINATION DO YOU PREFER?" | |
| ANSWER IDENTIFIER | ANSWER |
| A1 | RED / YELLOW |
| A2 | BLUE / BLACK |

570

| TEST IDENTIFIER 0099 | |
|---|---|
| MAILING LIST IDENTIFIER: A11 | |
| QUESTION IDENTIFIER: Q2 | |
| QUESTION: "WHAT TYPE OF INFORMATION ARE YOU MOST INTERESTED IN?" | |
| ANSWER IDENTIFIER | ANSWER |
| A3 | HIGH LEVEL OVERVIEW |
| A4 | DETAILED DESCRIPTION |

FIG. 5B

| TEST IDENTIFIER 620 | BUSINESS IDENTIFIER 622 | MAILING LIST IDENTIFIER 624 | NUMBER SENT 626 | NUMBER OF RESPONSES 628 | RESPONSE RATE 630 |
|---|---|---|---|---|---|
| 0098 | 111-222 | A | 2,000 | 20 | 1% |
| 0098 | 111-222 | E | 2,000 | 40 | 2% |
| 0100 | 222-333 | B | 1,500 | 23 | 1.5% |
| 0100 | 222-333 | F | 1,800 | 6 | 0.3% |
| 0102 | 333-444 | A | 3,000 | 15 | 0.5% |
| 0102 | 333-444 | D | 2,400 | 25 | 1.04% |
| 0102 | 333-444 | E | 2,800 | 40 | 1.4% |

TEST IDENTIFIER: 0099 _652_

BUSINESS IDENTIFIER: 222-333 _654_

ANSWER IDENTIFIER; TOTAL RESPONSE RATE: A1; 1.2% _656_

ANSWER IDENTIFIER; TOTAL RESPONSE RATE: A2; 0.97% _658_

ANSWER IDENTIFIER; TOTAL RESPONSE RATE: A3; 1.0% _660_

ANSWER IDENTIFIER; TOTAL RESPONSE RATE: A4; 1.2% _662_

| MAILING LIST IDENTIFIER _664_ | QUESTION IDENTIFIER _666_ | ANSWER IDENTIFIER _668_ | NUMBER SENT _670_ | NUMBER OF RESPONSES _672_ | ANSWER RESPONSE RATE FOR MAILING LIST _674_ | TOTAL MAILING LIST RESPONSE RATE _676_ |
|---|---|---|---|---|---|---|
| A | Q1<br>Q1<br>Q2<br>Q2 | A1<br>A2<br>A3<br>A4 | 2,000 | 20<br>14<br>2<br>32 | 1.0%<br>0.7%<br>0.1%<br>1.6% | 1.7% |
| B | Q1<br>Q1<br>Q2<br>Q2 | A1<br>A2<br>A3<br>A4 | 2,000 | 18<br>24<br>20<br>22 | 0.9%<br>1.2%<br>1.0%<br>1.1% | 2.1% |
| C | Q1<br>Q1<br>Q2<br>Q2 | A1<br>A2<br>A3<br>A4 | 2,000 | 36<br>20<br>40<br>16 | 1.8%<br>1.0%<br>2.0%<br>0.8% | 2.8% |

SYSTEM AND METHOD FOR MAILING LIST TESTING SERVICE

The present invention relates to direct-marketing mailing lists. In particular, the present invention relates to systems and methods for selecting appropriate direct-marketing mailing lists.

BACKGROUND OF THE INVENTION

Marketing Logistics, a research firm that monitors the direct marketing industry, reports that mail order sales of personal computers, consumer electronics and related products reached $1.5 billion in 1985. Business-to-business mail order sales for computer software and data processing supplies for the same year were $1.7 billion. The Direct Marketing Association, a trade group, reports that revenue from direct marketing for all product categories, now around $44 billion, is growing 10 percent a year—about twice as fast as retail.

Many businesses practice direct marketing by utilizing commercially-obtained mailing lists. These lists can be obtained from mailing list brokers such as BEST'S MAILING LIST, INC. or NATIONWIDE DATA SERVICES. Such mailing lists are typically compiled from various sources such as public real-estate documents, census bureaus, financial publications, and direct mail respondents. Members of the list, that is, people whose information is used to compile the list, typically consist of individuals who have provided information about their lifestyles and product usage through detailed surveys. For example, computer hardware or software purchasers that send in software and hardware vendor registration cards and surveys are typically placed on a mailing list geared towards the PC and technology industry.

Mailing list brokers exist and can supply a business with a multitude of lists from which to choose. Additionally, mailing list brokers can supply a business with lists of different formats, and try to accommodate the business's preferences. Alternatively, businesses can obtain personalized mailing lists geared towards their needs by consulting with a mailing list manager directly rather than going through a broker. The business then utilizes these mailing lists by sending out promotional items such as brochures, advertisements, or sale offers to persons included on the lists.

Businesses typically consider finding appropriate lists a problem. Also, skyrocketing paper prices and production expenses, as well as rising postage prices, have made it increasingly difficult to do cost-effective mailings. It is believed that the choice of mailing list is one of the most critical factors related to the success of a direct marketing campaign. This is because the best list can often result in ten times the response as the worst list for an identical mailing piece.

Unfortunately, approximately 40,000 different mailing lists exist that are available for rental today, making it difficult to pick the most appropriate list, and expensive to try multiple lists. Because of this, a business will typically purchase a mailing list without any indication of how successful the list will be for the business's particular purposes. Mailing lists are generally updated based on the responses of the individuals included on a mailing list. For example, if an individual on a mailing list has not responded to any mailings in the past year, he can be taken off the mailing list. In the meantime, however, businesses are purchasing mailing lists without being able to predict the number of responses to be expected from a given list. The most that a business or mailing list broker knows is the historical response rate of the individuals contained on the list to direct mailings of a general nature. There is no way for a business to judge just how effective a mailing list is for their particular product or service until the list is actually used.

Internet based mailing lists which include e-mail addresses for direct marketing are also becoming popular. This type of direct marketing offers several advantages over postal marketing. For example, e-mail campaigns can be set up and executed in a relatively short amount of time, and can begin to generate responses almost immediately. Also, it is possible to deliver several hundred thousand e-mails an hour and to easily track all phases of the status of delivery and response from a mailer's desktop. The impact of a direct marketing e-mail mailing is not nearly as high as that of a postal mailing, however. The postal mailing is a more tangible good in the prospective consumer's hand. Also a person is more likely to flip through a longer brochure at home than to click through one at their PC terminal. Thus, e-mail can be an excellent vehicle for relatively small brochures, but the postal mailing remains the most effective process for attracting the buying power of a consumer.

Thus, a need exists for a business to be able to efficiently and cost-effectively select an appropriate postal mailing list before investing a large amount of resources into utilizing the mailing list.

SUMMARY OF THE INVENTION

To alleviate the problems inherent in the prior art, the present invention discloses systems and methods for creating and selecting a mailing list.

In one embodiment of the present invention, a method for providing a mailing list test service is disclosed. This mailing list test service tests a plurality of mailing lists, each mailing list including information about a plurality of list members. To perform the test, a computer-based message, such as an electronic mailing (e-mail), is sent to each of a subset of list members for each mailing list. At least one response from a list member is received, and based on the received responses, one of the mailing lists is selected for use in a postal mailing campaign.

BRIEF DESCRIPTION OF THE DRAWINGS

FIG. 3 is a tabular representation of a mailing list database according to an embodiment of the present invention.

FIG. 4 is a tabular representation of a recipient database according to an embodiment of the present invention.

FIG. 5A is a tabular representation of a test database according to an embodiment of the present invention.

FIG. 5B is a tabular representation of a test database and exemplary records from a questions database according to an embodiment of the present invention.

FIG. 6A is a tabular representation of a transaction database according to an embodiment of the present invention.

FIG. 6B is a tabular representation in which test e-mails can be used to get feedback on the potential postal mailings.

DETAILED DESCRIPTION

Figure 1:
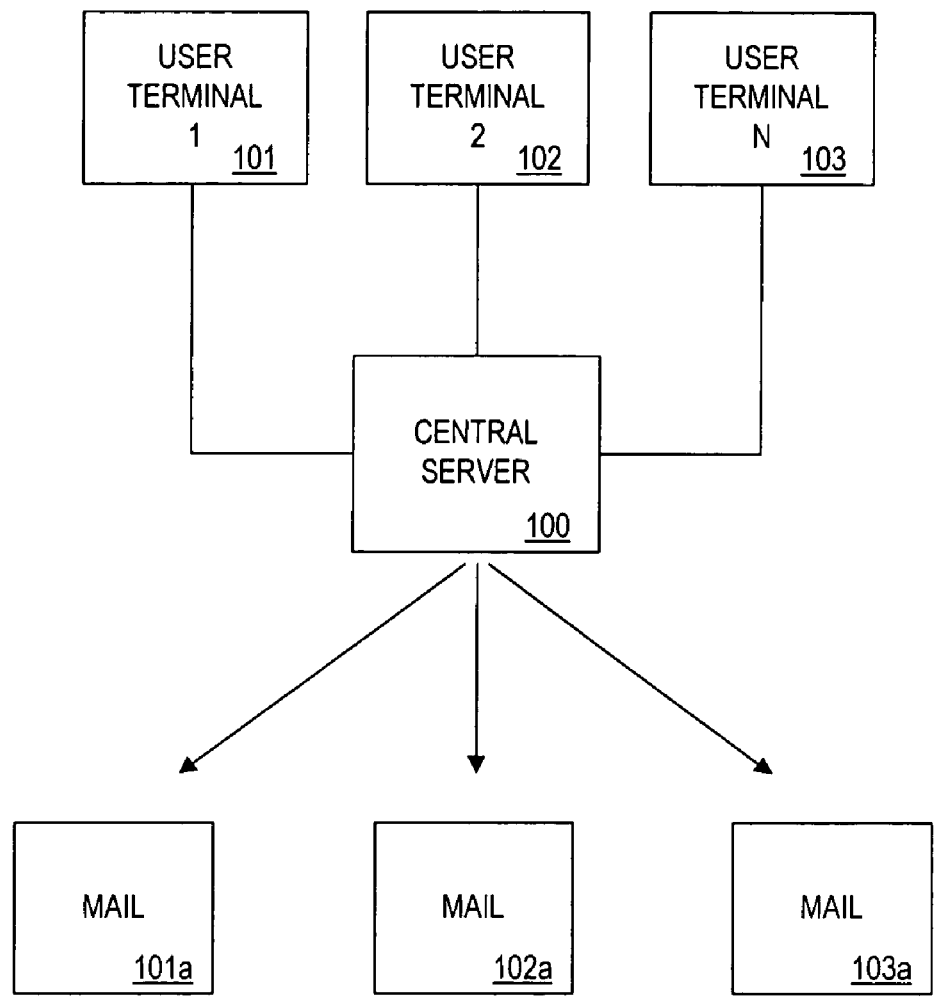
FIG. 1 is a block diagram overview of the system of the present invention.

The present invention is a method and system for providing a mailing list test service. As a contextual example, but not the only example, of the present invention, consider a small business that desires to directly market its goods by mailing brochures to potential customers. This small business can employ the service of a mailing list broker and select one of the many mailing lists to use in its marketing efforts. Of course, as discussed above, selecting the appropriate list is crucial in the business's marketing efforts, and so the small business is faced with making a guess as to which mailing list would be most effective for their particular product.

To avoid such guesswork, the small business can employ the services of a mailing list broker that practices the present invention. This mailing list broker can use e-mail lists that correlate to postal mailing lists to pre-test the effectiveness of the postal mailing list. Because of this correlation, e-mail lists serve as a reliable response predictor of its associated postal mailing list. In this contextual example, e-mail-list corresponds to members of a postal mailing list. That is, for each e-mail address there is an individual postal mailing address contained in the mailing list. For example, e-mail addresses may be stored in a database in association with the postal mailing address of each list member in a particular postal mailing list. A subset of list members may then be selected from the list and a test e-mail will be sent to those selected list members. The subset of list members can be selected randomly, or can be selected with an eye toward various factors such as the demographics of the particular members, because the postal mailing lists are already compiled based on such factors. In addition, a business can often narrow their choice of postal mailing lists to a few that generally match a business's needs, because postal mailing lists often include people of a certain age bracket, geographical area, or with a certain purchasing history.

A broker selling mailing lists can offer to pretest some of the possible lists for a prospective buyer/renter in order to assure them that they are getting the best list for their money. A broker can charge a small fee or provide the service for free. Alternatively, the broker may inflate the fee associated with the resultant mailing list.

As another contextual example, consider a world-renowned author who has recently published his latest book on cryptography. Rather than spending a lot of money on a mailing list without any indication of its effectiveness, the author decides to pre-test several possible mailing lists. The author picks lists A, B, C, and D to pretest. A subset of individuals from each list is selected. A test e-mail is sent to these individuals, in which the e-mail contains an offer for a free newsletter on cryptography written by the author. The response rate (i.e. number of people accepting the offer) of each mailing list is then compiled and the list with the highest response rate is chosen as the best one to be purchased/rented by the author.

Turning now in detail to the drawings, FIG. 1 is a system overview of an embodiment of the present invention. In this embodiment, central server 100 provides the mailing list test service. Central server 100 can send an e-mail to user terminal 101, user terminal 102, user terminal 103, utilizing, for example, bulk e-mail software such as that available from Acxiom/Direct Media, Inc., a provider of online direct marketing management software. Each of the user terminals 101, 102 and 103 correspond to postal mailboxes 101a, 102a, and 103a, respectively. In other words, the person who receives e-mail at user terminal 101 also receives postal mail at postal mailbox 101a, the person who receives e-mail at user terminal 102 also receives postal mail at postal mailbox 102a, and the person who receives e-mail at user terminal 103 also receives postal mail at postal mailbox 103a. The owners of postal mailboxes 101a, 102a and 103a are part of a single mailing list, which typically includes other members.

After sending test e-mails to user terminals 101, 102 and 103, central server 100 may receive one or more responses to the test e-mails from some or all of the user terminals 101, 102, and 103. This action is performed for a number of mailing lists, and based on the responses received by central service 100, an appropriate mailing list is selected for use.

According to one embodiment of the present invention, all the test e-mails sent to list members include the same content. In another embodiment of the present invention, the test e-mails sent to list members can include different content for different list members.

There are a variety of ways of detecting responses to, or interest in, the subject matter of the e-mail in order to determine the expected effectiveness of the associated postal mailing lists. In one embodiment of the present invention, the central server 100 detects whether recipients of the test e-mails have responded by detecting whether they have replied to the e-mail (e.g., by using the "Reply" button). In another embodiment of the present invention, the e-mail can include a Universal Resource Locator (URL) to the Web site of the business for which the test is being performed. The URL in the test e-mail can contain an identifier that allows the central server 100 to detect that access via that URL is directed from a test e-mail. The URL embedded in a test e-mail can be different from the URL(s) available to the general public for that business. The URL(s) embedded in the test e-mails may also be different from each other. Such a system for providing an interactive response to direct marketing utilizing a URL is disclosed in U.S. Pat. No. 5,793,972 to Shane. The entirety of U.S. Pat. No. 5,793,972, entitled "SYSTEM AND METHOD PROVIDING AN INTERACTIVE RESPONSE TO DIRECT MAIL BY CREATING PERSONALIZED WEB PAGE BASED ON URL PROVIDED ON MAIL PIECE", filed on May 3, 1996, is incorporated by reference herein as part of the present disclosure.

In another embodiment of the present invention, the test e-mails can include links to Web sites having subject matter that is similar to that of the prospective postal mailing. A Web site can detect where a visitor has come from by, for example, reading the visitor's "cookies" stored in the visitor's user terminal. Thus, the Web sites whose links are embedded in the test e-mail are able to detect that the visitor has come from a link provided in the e-mail. The computer that maintains the Web site can record the number of visitors that come to the Web site from the e-mail and then forward that information to the central server 100. Various methods of determining whether a recipient of an e-mail has responded to the e-mail are known to those skilled in the art and need not be discussed in detail herein.

In one embodiment of the present invention, recipients of the test e-mails can be compensated for their response. This can increase the effectiveness of the subsequently selected postal mailing list because the recipient associates the business with money that they have earned/received previously. For the purposes of the present invention, the term "compensated" includes, but is not limited to, monetary payment or payment of perceived value points (e.g., frequent flyer miles).

Figure 2:
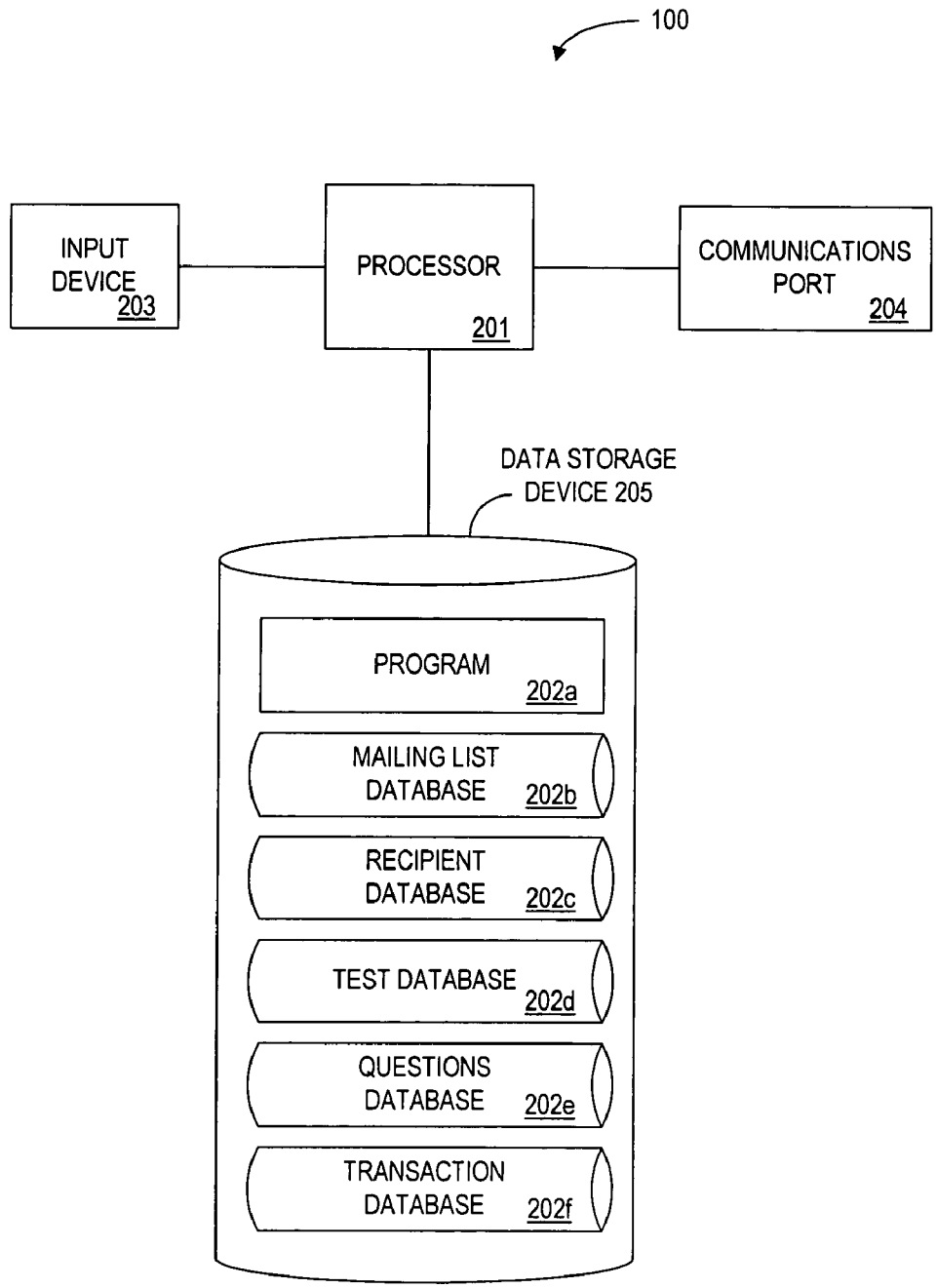
FIG. 2 is a schematic block diagram of the central server according to an embodiment of the present invention.

FIG. 2 is a schematic block diagram of central server 100 used to provide a mailing list test service, according to an embodiment of the present invention. The central server 100 includes processor 201 coupled to input device 203, and communications port 204. The central server 100 also includes data storage device 205. Data storage device 205 contains instructions adapted to be executed by processor 201 to perform at least one embodiment of a method of the present invention. For example, data storage device 205 can store instructions adapted to be executed by processor 201 to first send an e-mail to each of a subset of list members for each mailing list stored in mailing list database 202, then to receive at least one response to the sent e-mails, and to select a postal mailing list for use based on the received responses.

For the purposes of the present invention, data storage device 205 can include any medium capable of storing instructions adapted to be executed by a processor. Some examples of such media include, but are not limited to, floppy disks, CD-ROM, magnetic tape, hard disk, RAM, ROM, or any other device that can store computer-readable information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

As shown in FIG. 2, data storage device 205 stores a program 202a, mailing list database 202b, recipient database 202c, test database 202d, questions database 202e and transaction database 202f. Program 202a includes instructions for implementing the present invention, examples of which are described in detail with respect to FIGS. 9–12. For example, program 202a can implement a method for providing a mailing list test service involving a plurality of mailing lists, each mailing list including information about a plurality of list members, to send a computer-based message, such as an e-mail, to each of a subset of list members for each mailing list in the plurality of mailing lists, receive at least one response based on the computer-based message, each received response being associated with a list member from a subset of list members, and selecting for use based on the responses, one of the plurality of mailing lists. The selected mailing list can be sold or leased for a direct-marketing mailing.

Mailing list database 202b is described in detail with respect to FIG. 3. Recipient database 202c is described in detail with respect to FIG. 4. Test database 202e and questions database 202e are described in detail with respect to FIGS. 5A and 5B. Transaction database 202f, is described in detail in relation to FIGS. 6A and 6B. In FIG. 3, table 300 is representative of a portion of mailing list database 202b in accordance with an embodiment of the present invention. As shown in FIG. 3, table 300 can contain a list identifier 320 that identifies a list. For each postal mailing list, additional information is provided in various fields that describe the list. Table 300 contains (i) a target industry field 322, which describes the industry within which the recipients included on the list have exhibited interest in; (ii) a list member age bracket field 324, which indicates a range of ages of the recipients included on the list; (iii) a list member geographical location field 326, which indicates the general location within which the recipients included on the list reside; (iv) a list member salary bracket field 328, which indicates a salary range of the recipients included on the list; and (v) a price field 330, which indicates the cost of the list for purchase or rental. For example, according to table 300 shown in FIG. 3, list A pertains to a target industry of PC technology. The list members in list A are 18–25 years old, live in the northeastern United States, and earn between $15,000 and $30,000 per year. The price of list A is $2,000.

In FIG. 4, table 400 is a tabular representation of a portion of recipient database 202c according to an embodiment of the present invention. Table 400 contains contact information for each list member appearing on at least one of the postal-mailing lists offered by the central server 100 (FIG. 1). As shown in FIG. 4, each recipient, that is, each person on a postal-mailing list to whom a test e-mail can be sent, is identified by a recipient identifier field 420, a recipient name field 422, a recipient postal address field 424, a recipient e-mail address field 426. In addition, the table 400 shown in FIG. 4 includes the identifier of the list or lists to which a given recipient belongs, indicated in the list identifier field 428. For example, John Doe is identified by his recipient identifier "12345". His postal address is 10 New St., Town USA, and his e-mail address is doe@aol.com. Finally, recipient John Doe is a list member of postal mailing list A and postal mailing list E.

FIG. 5A is a record 500, representative of a record of test database 202d in accordance with an embodiment of the present invention. Record 500 includes, for each test identifier, identified in the test identifier field 502, (i) a recipient identifier field 504 that identifies the recipient who received this particular test e-mail; (ii) a mailing list identifier field 506 that identifies the mailing list from which the particular recipient was chosen, and (iii) a response field 508, which indicates whether the recipient responded to the test e-mail (e.g., "Y" for yes, or "N" for no). In one embodiment of the present invention, a determination of the most successful mailing list can be made from this database by querying the record 500 for the number of the "Y" responses for each particular mailing list identifier.

According to another embodiment of the present invention, the test e-mail contains questions. In this embodiment, responses received by central server 100 (FIG. 1) include answers to the questions. The answers are subsequently extracted from the response and analyzed. A mailing list can be chosen based on either the response rate of a given list, or based on the answers supplied by the list members. For example, a mailing list can be chosen based on the number of responses that include a predetermined answer or type of answer.

Another embodiment of the present invention provides for testing simplified product variations, thereby reducing marketing costs involved in product testing. Typically, businesses do not know the most effective layout, color scheme or information content in a marketing brochure. To alleviate this problem, the present system can be used by a business to pre-test various versions of the postal mailing brochure before incurring the costs of printing such brochures.

As an example of this embodiment, the test e-mails can contain various versions, such as versions of a product brochure. The business can send one color scheme version in one batch of test e-mails (i.e. one mailing list) and another color scheme in another batch. A mailing list, and thus a color scheme, can be selected based on the response to the various test e-mails. Alternatively, a mailing list may be created by aggregating responses (e.g. favorable responses).

Other features that a business can pre-test via test e-mails include (i) the informational content of the postal mailing; (ii) the layout of the postal mailing; and (iii) other related products to be included in the postal mailing. When the results of test e-mails are available, the business will not only know which postal mailing is most effective for their product but also will gain some valuable insights into which version of the postal mailing brochure is predicted to be the most effective.

The business can also include in the test e-mails survey questions that elicit respondent feedback, such as what other kind of information the respondent might want to see in the postal mailing or what aspects of the test e-mail the respondent did or did not like. The business can gather and analyze these responses to refine the future postal mailings.

The e-mail testing system can pre-test variations of products and select the variation with the highest response rate or the most favorable response rate. For example, the design of a cereal box can be pre-tested in such a way. A manufacturer can design several different color schemes for the box, attach images of the designs to the test e-mails and send the test e-mails to a set of recipients. The design that receives the most responses or the most favorable responses is the one chosen by the manufacturer as a likely candidate for further enhancements and modifications to be tested via a postal mailing.

As another example, consider a business that sells novelty technology items. The business would like to buy/rent a mailing list and, based on their demographic requirements, the business has the option of buying or renting one of three mailing lists, A, B, or C. To determine which would be the most effective list for them to buy or rent, the business sends out test e-mails, which contain a description of a new product from their latest catalog.

In this example, there can be two versions of the description, each containing a different picture of the item. Some of the test e-mails contain the first version and some of the test e-mails contain the second version. The central server 100 (FIG. 1) sends the test e-mails to a subset of each mailing list A, B, and C. Based on the responses to the e-mails, the system determines (i) which mailing list generated the most responses; and (ii) which version of the e-mail generated the most responses. Each e-mail sent out includes an indication of the mailing list that the recipient of the e-mail belongs to and the version of the e-mail. Thus when the central server 100 (FIG. 1) receives a reply to the e-mail it is able to recognize and record the recipient and version. When the business receives the results of the test, they are able to select the most effective presentation of the product (e.g. which picture of the product generated the most responses) as well as the most effective mailing list for their type of product. In general, the test e-mails sent can have different content from one another.

Accordingly, the present invention may be utilized, via central server 100 (FIG. 1), to gather data from the responses and to determine the number of responses. In other words, the test e-mails can be used as questionnaires or surveys regarding (i) the product, or (ii) potential consumer concerns and/or preferences. Thus, when the responses to the test e-mails are received by central server 100 (FIG. 1), not only does the central server 100 (FIG. 1) tally the number of responses from each postal mailing list subset but it also accumulates the responses to the questions within the test e-mails and stores them for subsequent analysis. For example, a response to the test e-mails can include the rating of the content of the test e-mails, and a content preference rating can be determined and used to select the mailing list from the plurality of mailing lists. Using the responses received, and based on pre-selected criteria such as demographics or response rate, a custom postal-mailing list can be created.

As an example, assume a business is considering postal-mailing lists A, B, C, and D for rental. The business is also debating whether, on the one hand, to include a detailed description of their product in the catalog, or on the other hand, to present only high-level description of the product. Thus, when the central server 100 (FIG. 1) sends out test e-mails to the individuals of the subset of each potential mailing list, the e-mail will include a survey question that identifies which of the two descriptions are preferred. For example, the questionnaire can present two versions of a product description, one focused on technical description of the product and one focused on the high level description of the product. The questionnaire can include a request to indicate the preferred version of the product description. Once the business receives the results (possibly from the central server 100 (FIG. 1)), the business is able to determine not only which mailing list resulted in the most responses, but also which version of the product description the majority of the recipients preferred.

FIG. 5B is a tabular representation of a portion of a test database record 550 and two question database records 560 and 570. The records in FIG. 5B can typically be used in an embodiment of the present invention in which the test e-mails are also used to collect feedback on the potential postal mailing. In the exemplary test database record 550 illustrated in FIG. 5B, for a given test identified by a given test identifier 551, each recipient is identified by a unique recipient identifier 552. The postal-mailing list for which the recipient is a list member is identified with a mailing list identifier 554. The question sent to the recipient is identified with a question identifier 556 and the answer identifier included in the recipient's response to the test e-mail is stored in answer identifier 558. The answer identifier for a given entry is set to "N/A" until such a time as when an answer identifier is received from a recipient corresponding to the entry.

The questions database records 560 and 570 in FIG. 5B are tabulated to show that, for each test identifier, mailing list identifier, and question sent in the test e-mail, an answer identifier and its corresponding answer is stored. In the example of FIG. 5B, each of the test e-mails sent out from the various mailing list subsets contain the same two questions and corresponding answer choices. In other embodiments, the mailing list test can include different questions for each of the subsets.

In FIG. 6A, table 600 is representative of a portion of an exemplary transaction database 202f that can be stored in data storage device 205 according to an embodiment of the present invention. As shown in FIG. 6A, the transaction database 202f records each of the transactions (i.e. tests) performed by the central server 100. Specifically, the transaction database can store, for each business using the mailing list test service, a test identifier 620, a business identifier 622, a mailing list identifier 624, how many test e-mails were sent 626 for each mailing list identifier, how many responses were received 628 from the test e-mails, and the response rate 630 for that mailing list, or any subset of these categories. For example, business "111–222" sent, to 2,000 list members of postal mailing list A, a test identified by test identifier "0098". Twenty responses were received, giving a response rate of 1%. In addition, business "111–222" sent the same test to 2,000 members of postal mailing list E. Forty responses were received, giving a response rate of 2%.

In FIG. 6B, table 650 is representative of a record of transaction database 202f in accordance with an alternate embodiment of the present invention. Table 650 may be used in the embodiment wherein the test e-mails are used to obtain feedback on the potential content of the postal mailings. Table 650 can identify a transaction by the business identifier field 652 that identifies a business requesting the mailing list test service and the test identifier field 654 that identifies the test identifier used for each postal-mailing list examined. Specifically, in Table 650, postal-mailing lists were tested for a business identified by business identifier "222–333". This test is identified by a test identifier "0099". The test e-mails of Table 650 were sent to list members of mailing lists A, B and C, indicated by mailing list identifier field 664. Each test e-mail includes two questions, identified by question identifier field 666.

The two questions included in test "0099" are identified as "Q1" and "Q2". The possible answers to each question "Q1" and "Q2" are identified in the answer identifier field 668. Question "Q1" has two possible answers, identified by answer identifiers "A1" and "A2", respectively. Question Q2 has two possible answers, identified by answer identifier A3 and A4, respectively. The test e-mails were sent to 2,000 recipients of each mailing list A, B, and C, as indicated in the Number Sent field 670. The number of responses received for each answer choice within each mailing list is indicated in the Number of Responses field 672. The response rate for each answer choice within each mailing list is indicated in the Answer Response Rate For Mailing List field 674. For example, 20 recipients of mailing list A responded to question "Q1" with answer choice "A1", therefore the response rate for mailing list A, answer "A1" is 1.0% ((20/2000) *100= 1.0). The total response rate for each mailing list is indicated in the Total Mailing List Response Rate field 676. For example, thirty-four recipients of mailing list A responded to the test e-mail, as indicated by the total number of responses for each question within each mailing list (i.e. for mailing list A, 20 recipients selected answer choice A1 for Q1 and 14 recipients selected answer choice A2 for Q1, resulting in a total of 34 responses to Q1). Thus the total response rate for mailing list A is 1.7% ((34/2000) *100=1.7). Table 650 also contains the total response rate for each answer choice, regardless of the mailing list associated with it. The total response rate for answer A1, A2, A3, and A4 is indicated in Answer Identifier/Response Rate fields 656, 658, 660, and 662, respectively. For example, the total response rate for answer A1 was 1.2%. That is, for the 6,000 recipients who received Q1 (2,000 recipients for each of the three mailing lists A, B, and C), seventy-four selected answer choice A1 (20 recipients from mailing list A+18 recipients from mailing list B+36 recipients from mailing list C=74 recipients). That results in a total response rate of 1.2% for answer choice A1 ((74/6000)*100=1.2).

The information presented in Table 650 may be utilized by a business in deciding on the content of the postal mailing to be sent out based on the results of the test e-mails. For example, let's say that Q1 comprised the question "Which layout do you prefer?" and answer choice A1 comprised a first potential layout and answer choice A2 comprised a second potential layout. The results of the test "0099" indicate that the majority of recipients preferred the first potential layout, since A1 had a higher response rate than A2. Alternatively, referring to the same example, the business may choose to utilize the results from each mailing list individually. For example, the business may choose to send a postal mailing to recipients of all three mailing lists A, B, and C, but to include different layouts for the recipients of the respective mailing lists. In such a scenario, mailing list A recipients will receive the A2 layout, since the majority of mailing list A recipients preferred the layout corresponding to A1. Mailing list B recipients will receive the A2 layout, since the majority of mailing list B recipients preferred the layout corresponding to A2. Similarly, mailing list C recipients will receive the A1 layout, since the majority of mailing list C recipients preferred the layout associated with A1. In this manner, a business may maximize the potential response rate to a postal mailing.

Figure 7:
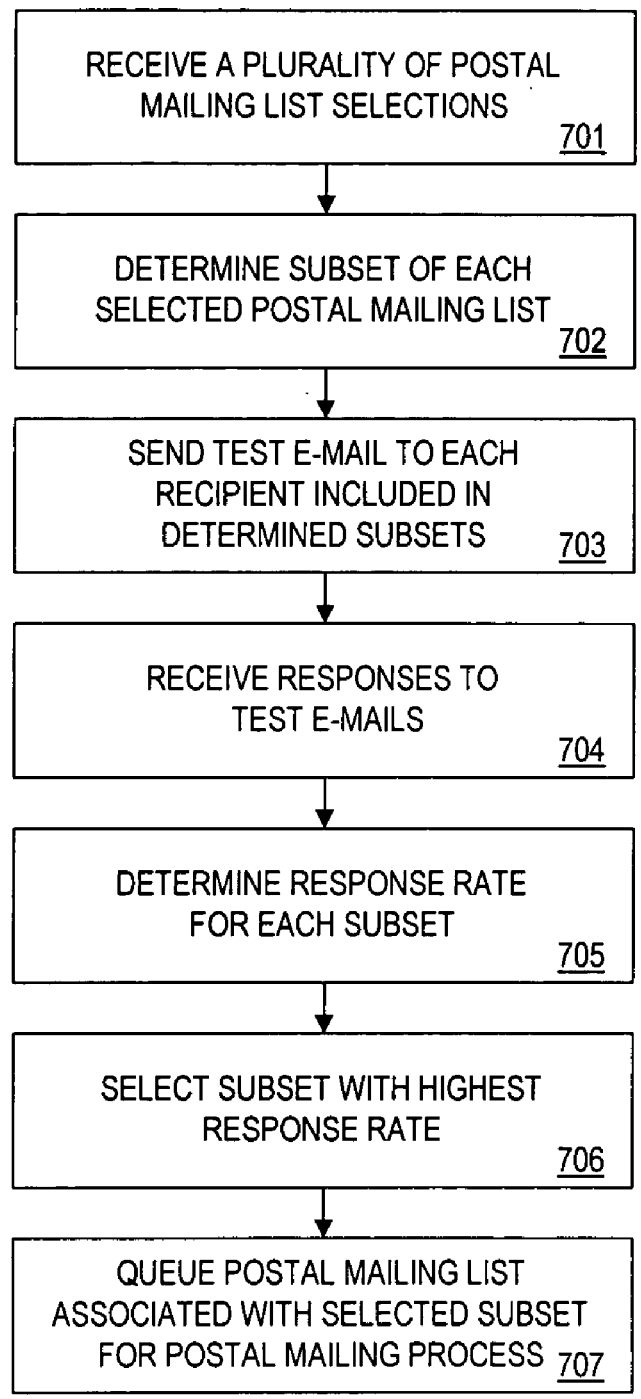
FIG. 7 is a flow chart of a method of practicing an embodiment of the present invention.

FIGS. 7, 8, 9 and 10 are flow charts illustrating methods of preparing a mailing list test and analyzing and using the results. As shown in FIG. 7, at step 701, a plurality of postal mailing list selections is received. These postal-mailing lists can be stored in a postal-mailing list database. At step 702, a subset of list members of each of the plurality of postal mailing lists is determined. This determination can occur at random, or in a predefined manner (e.g., the first 100 list members from each list are selected). A test e-mail is then sent, at step 703, to each recipient included in the determined subsets. As discussed above, the test e-mails can all have the same content, or can have content different from one another. For example, each test e-mail can be the same advertisement for a product, or one or more test e-mail can be a different advertisement for a product from the other test e-mails. Each test e-mail can contain the same question, or one or more test e-mails can contain a different question from the other test e-mails.

At step 704, responses to the test e-mails are received. These responses will typically be fewer than the number of test e-mails that were sent. At step 705, a response rate is determined for each subset of test e-mails. The subset with the highest response rate is then selected at step 706, and its associated postal mailing list is queued for mailing. Note that at step 706, depending on the response received, a subset can be chosen based on responses weighted by demographics using a demographic identifier. Likewise, a subset can be chosen based on any generalized function of the responses received, including the content of the responses.

Figure 8:
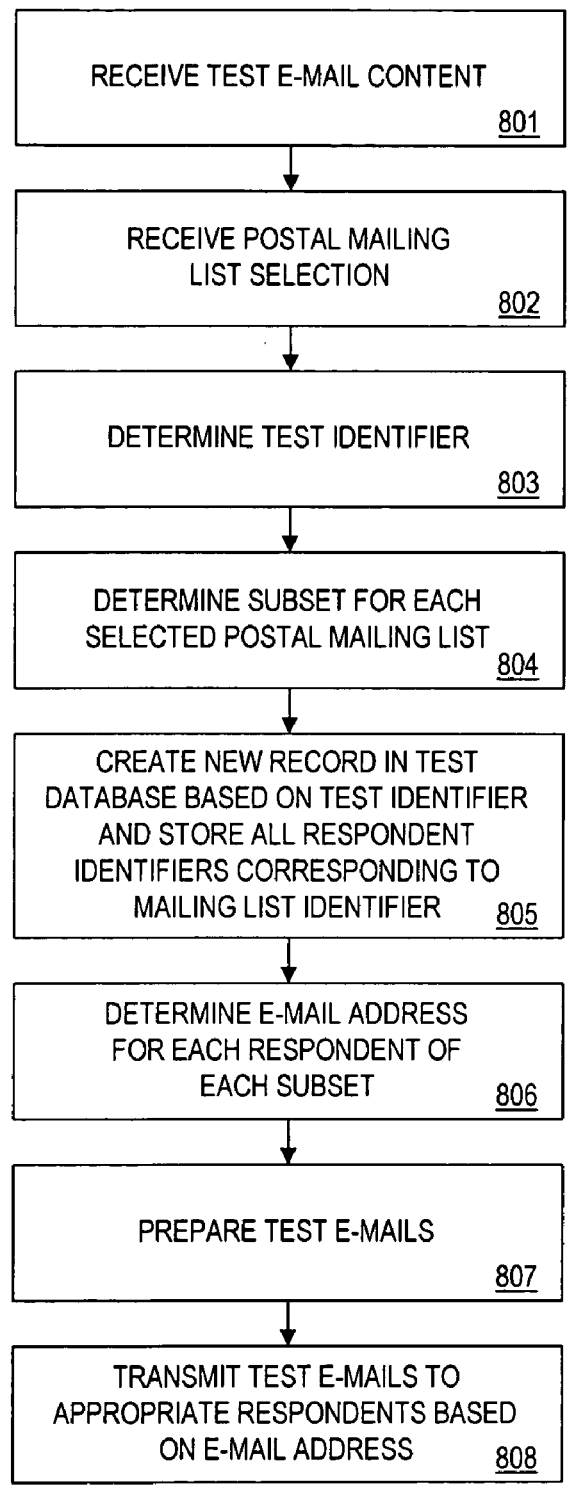
FIG. 8 is a flow chart depicting an exemplary method of creating a test e-mail according to an embodiment of the present invention.

FIG. 8 is a flowchart depicting a method of creating an e-mail test according to an embodiment of the present invention. As shown in FIG. 8, e-mail content is received in step 801. E-mail content can include questions, pictures, questionnaire layout, etc. At step 802, a postal-mailing list selection is received, and which test is to be sent, identified by a test identifier, is determined at step 803. At step 804, a subset of list members for each selected postal-mailing list is identified. A new record is then created in the test database at step 805. The new record is based on the test identifier. In addition, in this step, all respondent identifiers corresponding to a mailing list identifier are stored.

At step 806, the e-mail address for each respondent of each subset is determined, and the test e-mails are prepared at step 807. Finally, at step 808, the test e-mails are transmitted to the appropriate respondents based on the e-mail address.

The step of preparing test e-mails can comprise combining the e-mail content received in step 801 and the test identifier determined at step 803, respectively, with (i) the respondent e-mail address, (ii) the respondent identifier, and (iii) the mailing list identifier or identifiers corresponding to each respondent. In one embodiment of the present invention, the process illustrated in FIG. 8 can utilize the test database of FIG. 5A. For example, the test identifier determined at step 803 can refer to a recipient identifier, a mailing list identifier and a response. In another embodiment of the present invention, this process can utilize the test database of FIG. 5B. In other words, aside from a recipient identifier, the test identifier determined in step 803 can refer to, aside from a recipient identifier, a mailing list identifier, a question identifier, and an answer identifier. In one embodiment, the step of preparing the test e-mails can also include attaching the appropriate questions from the question database, based on the test identifier, to the test e-mails.

Figure 9:
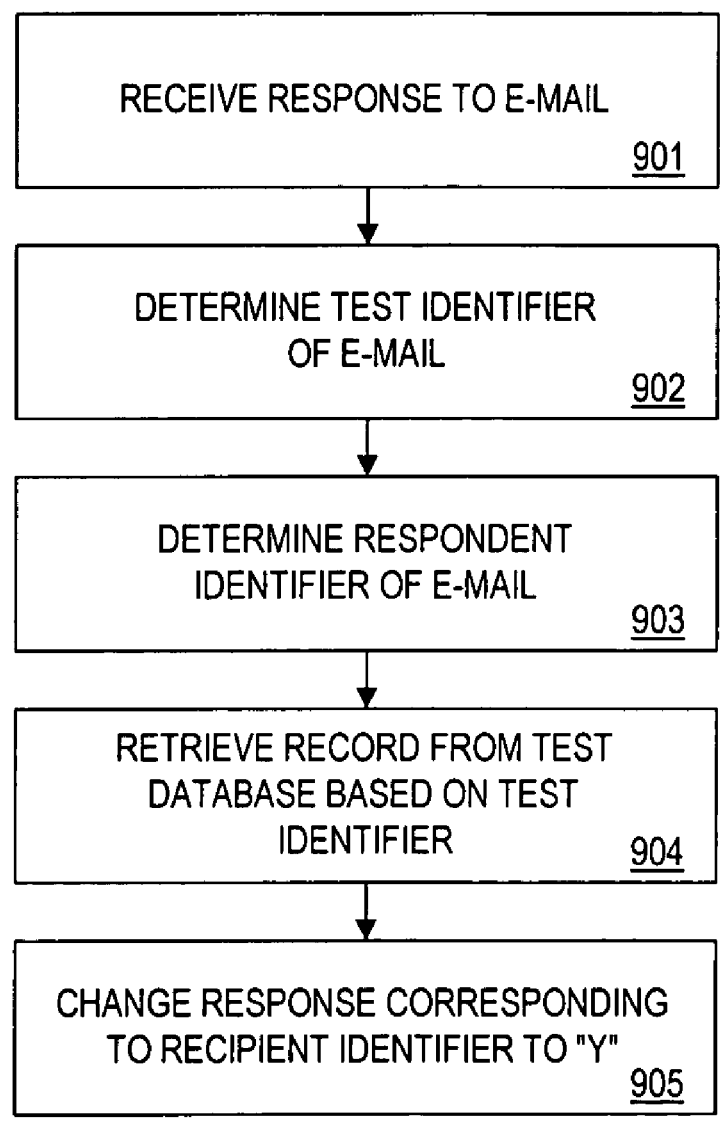
FIG. 9 is a flow chart depicting an exemplary method of receiving a response to a test e-mail according to an embodiment of the present invention.

FIG. 9 is a flowchart of a method of receiving a response to a test e-mail according to an embodiment of the present invention. As can be seen in this figure, a response to a test e-mail is received at step 901. Once the response is received, the various identifying parameters of the test e-mail can be determined. At step 902, the e-mail's test identifier is determined. At step 903, the e-mail's respondent identifier is determined. A record is then retrieved from the test database at step 904. The record retrieved is based on the test identifier. The response is then marked in the database at step 905. In one embodiment of the present invention, the response is marked in the database by changing the response corresponding to the recipient identifier to "Y." In one embodiment of the present invention, this process would use the test database of FIG. 5A. For example, the test identifier received at step 904 can refer to a recipient identifier, a mailing list identifier, and a response. In another embodiment of the present invention, this process can utilize the test database of FIG. 5B. In other words the test identifier received in step 904 can refer to, a mailing list identifier, a question identifier, and an answer identifier aside from a recipient identifier.

Figure 10:
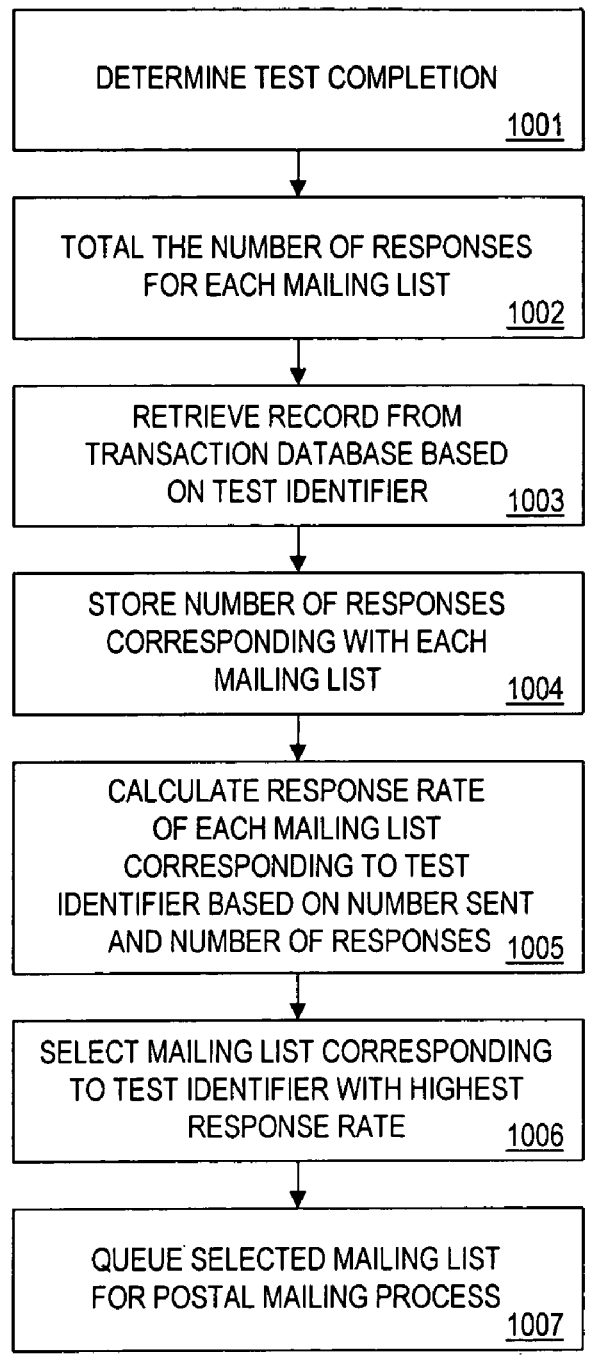
FIG. 10 is a flow chart depicting an exemplary method of analyzing the results of a test e-mail and selecting the most effective postal mailing list to use according to an embodiment of the present invention.

FIG. 10 is a flowchart of a method of analyzing the results of the e-mail test and selecting the most effective postal mailing list to use according to an embodiment of the present invention. At step 1001, it is determined whether the test is completed. This determination can be made, for example, by limiting the amount of time for response and then determining whether that amount of time has elapsed.

At step 1002, the responses for each mailing list are totaled, and at step 1003, the appropriate record is retrieved from the transaction database. The appropriate record is identified based on a test identifier received in the response. The total number of responses for each mailing list are stored at step 1004. At step 1005, the response rate of each mailing list is calculated corresponding to the test identifier based on the number of test e-mails sent and the number of responses received. The mailing list corresponding to the test identifier with the highest response rate is then selected at step 1006. At step 1007, that mailing list is queued for the postal-mailing process.

The present invention is not limited to the variations described herein. Other variations will be apparent to one of ordinary skill in the art. For example, in another embodiment of the present invention a system and method is provided for creating a custom postal mailing list based on responses to test e-mails. In this embodiment, rather than using test e-mails to predict the response rate of an existing postal mailing list, the test e-mails are used to create a custom postal mailing list. To do this, a number of postal mailing lists are chosen, subsets of recipients are chosen from each, and a test e-mail is sent to each recipient. The identities of the respondents to each of the e-mails are determined and a postal mailing list is compiled from the responsive recipient identities and retrieved postal addresses associated with each.

As an example of this embodiment, assume postal mailing list A contains individuals 1 through 1000, postal mailing list B contains individuals 1001 through 2000, and postal-mailing list C contains individuals 2001 through 3000. The first 100 individuals out of each mailing list are selected as the subsets for the test e-mail (i.e. individuals 1 through 100, 1001 through 1100, and 2001 through 2100). Assume in this example that individuals 10 through 20, 60 through 90, 1080 through 1090, 2006 through 2016, and 2065 through 2080 respond to the e-mail). Based on these responses a new Mailing List D is created that contains individuals 10 through 20, 60 through 90, 1080 through 1090, 2006 through 2016, and 2065 through 2080. The postal mailing can then be sent out to the individuals on postal-mailing list D.

Thus, as shown above in the various embodiments and examples, the various problems in the prior art are overcome by the present invention. In particular, the present invention, as described above, provides an efficient and cost effective way of testing, selecting and creating a mailing list that is appropriate to a business's needs.

The present invention has been described in terms of several embodiments solely for the purpose of illustration. Persons skilled in the art will recognize that the invention is not limited to the embodiments described, but can be practiced modifications and alterations limited only by the spirit and scope of the appended claims.

What is claimed is:

1. A method for providing a mailing list test service involving a plurality of postal mailing lists, each postal mailing list including information about a plurality of list members, the information including a postal address for each list member, the method comprising:
 (a) sending, for each postal mailing list in the plurality of postal mailing lists, an e-mail message to each of a subset of list members;
 (b) receiving a plurality of responses, each received response corresponding to an e-mail message sent in (a), each received response being associated with a list member from one of the subsets of list members; and
 (c) selecting for use, based on the responses received in (b), one of the plurality of postal mailing lists.

2. The method of claim 1, further comprising:
 (d) selling the postal mailing list selected in (c).

3. The method of claim 1, further comprising:
 (d) renting to another the postal mailing list selected in (c).

4. The method of claim 1, further comprising:
 (d) mailing information via post to list members of the postal mailing list selected in (c).

5. The method of claim 1, wherein said sending an e-mail message in (a) includes:
 (i) sending, for a first postal mailing list in the plurality of postal mailing lists, a first e-mail message to a first member of the subset; and
 (ii) sending, for the first postal mailing list in the plurality of postal mailing lists, a second e-mail message to a second member of the subset;
 wherein the first e-mail message includes content different from the second e-mail message.

6. The method of claim 5, further comprising:
 (d) storing the responses received in (b).

7. The method of claim 5, wherein at least one of the plurality of postal mailing lists contains a first set of mailing list content, and another of the plurality of postal mailing lists contains a second set of content, and wherein the selecting in (c) includes selecting at least one of the plurality of postal mailing lists based on mailing list content included in the e-mail messages sent in (a).

8. The method of claim 1, wherein each resonse received in (b) includes a test identifier and a member identifier, and comprising the further steps of:
  (d) retrieving a test record from a test database based on the received test identifier; and
  (e) updating the retrieved test record to disclose, based on the received member identifier, that a response was received from a member associated with the member identifier.

9. The method of claim 8, wherein each response received in (b) further includes a question identifier and an answer identifier.

10. The method of claim 9, wherein said selecting one of the plurality of postal mailing lists includes selecting based on the received question identifier and the received answer identifier.

11. The method of claim 1, wherein said selecting one of the plurality of postal mailing lists includes:
  (i) determining a response rate of each of the plurality of postal mailing lists; and
  (ii) selecting the postal mailing list that has a response rate higher than the response rates of the other postal mailing lists.

12. The method of claim 1, wherein said receiving responses includes detecting the use of a uniform resource locator embedded in the e-mail message.

13. The method of claim 1, wherein a list member associated with a received response is compensated for the response.

14. An apparatus for providing a mailing list test service, comprising:
  (a) a processor;
  (b) a database including a plurality of postal mailing lists, each postal mailing list having information about a plurality of list members, the information including a postal address for each list member;
  (c) a port coupled to said processor; and
  (d) a memory including a database, said memory coupled to said processor, and said memory storing instructions adapted to be executed by said processor, the instructions including:
    (i) sending, for each postal mailing list in the plurality of postal mailing lists, an e-mail message to each of a subset of list members;
    (ii) receiving a plurality of responses, each received response corresponding to an e-mail message sent in (i), each received response being associated with a list member from one of the subsets of list members; and
    (iii) selecting for use, based on the responses received in (ii), one of the plurality of postal mailing lists.

15. The apparatus of claim 14, wherein said memory stores further instructions adapted to be executed by said processor, said further instructions including:
  (iv) selling the postal mailing list selected in (iii).

16. The apparatus of claim 14, wherein said memory stores further instructions adapted to be executed by said processor, said further instructions including:
  (iv) renting to another the postal mailing list selected in (iii).

17. The apparatus of claim 14, wherein said memory stores further instructions adapted to be executed by said processor, said further instructions including:
  (iv) mailing information via post to members of the postal mailing list selected in (iii).

18. The apparatus of claim 14, wherein the instructions to send an e-mail message include instructions adapted to be executed by a processor to:
  send, for a first postal mailing list in the plurality of postal mailing lists, a first e-mail message to a first member of the subset; and
  send, for the first postal mailing list in the plurality of postal mailing lists, a second e-mail message to a second member of the subset, wherein the first e-mail message includes content different from the second e-mail message.

19. The apparatus of claim 18, said memory storing further instructions adapted to be executed by said processor, the instructions including:
  (iv) storing the responses received in (ii).

20. The apparatus of claim 18, wherein one of the plurality of postal mailing lists contains a first set of mailing list content, and another of the plurality of postal mailing lists contains a second set of mailing list content, and wherein selecting in (iii) includes selecting one of the plurality of postal mailing lists based on mailing list content included in the e-mail messages sent in (i).

21. The apparatus of claim 20, wherein selecting in (iii) further includes:
  (i) determining a response rate of each of the plurality of postal mailing lists; and
  (ii) selecting a postal mailing list from the plurality of postal mailing lists that has a response rate higher than the response rate of the other postal mailing lists.

22. The apparatus of claim 14, said database including a mailing list database containing a member identifier, a test database containing a test identifier, a questions database, an answer database, and said memory storing further instructions adapted to be executed on said processor, the further instructions including:
  (iv) retrieving a test record from the test database based on a received test identifier; and
  (v) marking the retrieved test record to disclose, based on the member identifier, that a response was received from a list member associated with the member identifier.

23. The apparatus of claim 22, wherein the test database contains a question identifier and an answer identifier.

24. The apparatus of claim 14, wherein instructions to select a postal mailing list from the plurality of postal mailing lists include instructions to:
  determine the response rate of each of the plurality of postal mailing lists; and
  select the postal mailing list with the highest response rate.

25. The apparatus of claim 14, wherein said receiving responses includes detecting the use of a URL embedded in the e-mail message.

26. The apparatus of claim 14, wherein a list member associated with a received response is compensated for the response.

27. A medium storing instructions adapted to be executed by a processor to provide a mailing list test service for a plurality of postal mailing lists, each postal mailing list including information about a plurality of list members, the information including a postal address for each list member, said instructions comprising:
  (a) sending, for each postal mailing list in the plurality of postal mailing lists, an e-mail message to each of a subset of list members;

(b) receiving a plurality of responses, each received response corresponding to an email message sent in (a), each received response being associated with a list member from one of the subsets of list members; and (c) selecting for use, based on the responses received in (b), one of the plurality of postal mailing lists.

28. The medium of claim 27 storing further instructions adapted to be executed by a processor, said further instructions comprising:

(d) selling the postal mailing list selected in (c).

29. The medium of claim 27 storing further instructions adapted to be executed by a processor, said further instructions comprising:

(d) renting to another the postal mailing list selected in (c).

30. The medium of claim 27 storing further instructions adapted to be executed by a processor, said further instructions comprising:

(d) mailing information via post to members of the postal mailing list selected in (c).

31. The medium of claim 27, wherein the instructions to send an e-mail message in (a) include further instructions adapted to be executed by a processor to:

(i) send, for a first postal mailing list in the plurality of postal mailing lists, a first e-mail message to a first member of the subset; and (ii) send, for the first postal mailing list in the plurality of postal mailing lists, a second e-mail message to a second member of the subset, wherein the first e-mail message includes content different from the second e-mail message.

32. The medium of claim 31, said medium storing further instructions adapted to be executed by a processor to store the responses received in (b).

33. The medium of claim 31, wherein one of the plurality of postal mailing lists contains a first set of mailing list content, and another of the plurality of postal mailing lists contains a second set of content, and wherein said selecting in (c) includes selecting one of the plurality of postal mailing lists based on mailing list content in the e-mail messages sent in (a).

34. The medium of claim 33, wherein said selecting in (c) further includes:

(i) determining a response rate of each of the plurality of postal mailing lists; and (ii) selecting the postal mailing list that has a response rate higher than the response rate of the other postal mailing lists.

35. The medium of claim 27, wherein each response received in (b) includes a test identifier and a member identifier, and wherein the medium includes further instructions adapted to be executed by a processor, said further instructions comprising:

(d) retrieving a test record from a test database based on the received test identifier; and (e) marking the retrieved test record to disclose, based on the received member identifier, that a response was received from a member associated with the member identifier.

36. The medium of claim 35, wherein said instructions to receive a response to the e-mail message include instructions to:

(i) receive a question identifier; and (ii) receive an answer identifier.

37. The medium of claim 36, wherein the selection in (c) includes selecting based on the received question identifier and the received answer identifier.

38. The medium of claim 27, wherein said instructions to select a postal mailing list include instructions to:

(i) determine the response rate of each of the plurality of postal mailing lists; and (ii) select the postal mailing list that has the highest response rate.

39. A system for providing a mailing list test service involving a plurality of postal mailing lists, each postal mailing list including information about a plurality of list members, the information including a postal address for each list member, the system comprising:

(a) means for sending, for each postal mailing list in the plurality of postal mailing lists, an e-mail message to each of a subset of list members;

(b) means for receiving a plurality of responses, each received response corresponding to an e-mail message sent in (a), each received response being associated with a list member from one of the subsets of list members; and (c) means for selecting for use, based on the responses received in (b), one of the plurality of postal mailing lists.

40. The system of claim 39, further comprising:

(d) means for selling the postal mailing list selected in (c).

41. The system of claim 39, further comprising:

(d) means for renting to another the postal mailing list selected in (c).

42. The system of claim 39, further comprising:

(d) means for mailing information via post to list members of the postal mailing list selected in (c).

43. The system of claim 39, wherein said means for sending an e-mail message in (a) includes:

(i) means for sending, for a first postal mailing list in the plurality of postal mailing lists, a first e-mail message to a first member of the subset; and (ii) means for sending, for the first postal mailing list in the plurality of postal mailing lists, a second e-mail message to a second member of the subset, wherein the first email message includes content different from the second e-mail message.

44. The system of claim 39, further comprising:

(d) means for storing the received responses.

45. The system of claim 44, wherein one of the plurality of postal mailing lists contains a first set of mailing list content, and another of the plurality of postal mailing lists contains a second set of mailing list content, and wherein said means for selecting includes means for selecting one of the plurality of postal mailing lists based on mailing list content included in sent computer based messages.

46. The system of claim 45, wherein said means for selecting further includes:

(i) means for determining a response rate of each of the plurality of postal mailing lists; and (ii) means for selecting the postal mailing list that has a response rate higher than the response rate of the other postal mailing lists of the plurality of postal mailing lists.

47. The system of claim 39, wherein each response received in (b) includes a test identifier and a member identifier, and further comprising:

(d) means for retrieving a test record from a test database based on the received test identifier; and (d) means for marking the retrieved test record to disclose, based on the received member identifier, that a response was received from a member associated with the member identifier.

48. The system of claim 47, wherein the responses received in (b) further include a question identifier and an answer identifier.

49. The system of claim 48, wherein said means for selecting one of the plurality of postal mailing lists includes means for selecting based on the received question identifier and the received answer identifier.

50. The system of claim 49, wherein said means for selecting one of the plurality of postal mailing lists includes:

(i) means for determining a response rate of each of the plurality of postal mailing lists; and (ii) means for selecting the postal mailing list that has the highest response rate.

* * * * *